US007873680B2

(12) United States Patent
Meadows

(10) Patent No.: US 7,873,680 B2
(45) Date of Patent: *Jan. 18, 2011

(54) HIERARCHICAL INHERITED XML DOM

(75) Inventor: Chad L. Meadows, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 273 days.

This patent is subject to a terminal disclaimer.

(21) Appl. No.: 12/138,562

(22) Filed: Jun. 13, 2008

(65) Prior Publication Data

US 2008/0270442 A1 Oct. 30, 2008

Related U.S. Application Data

(62) Division of application No. 11/058,479, filed on Feb. 15, 2005, now Pat. No. 7,444,345.

(51) Int. Cl.
*G06F 7/00* (2006.01)
(52) U.S. Cl. ................. 707/811; 707/956; 707/999.101
(58) Field of Classification Search ........................ None
See application file for complete search history.

(56) References Cited

U.S. PATENT DOCUMENTS

| 6,718,516 | B1 | 4/2004 | Claussen et al. | |
|---|---|---|---|---|
| 7,743,074 | B1 * | 6/2010 | Parupudi et al. | ............ 707/802 |
| 2002/0023113 | A1 | 2/2002 | Hsing et al. | |
| 2002/0038319 | A1 | 3/2002 | Yahagi | |
| 2003/0126556 | A1 | 7/2003 | Soetarman et al. | |
| 2003/0140308 | A1 | 7/2003 | Murthy et al. | |
| 2003/0195885 | A1 | 10/2003 | Emmick et al. | |
| 2003/0204481 | A1 | 10/2003 | Lau | |

(Continued)

FOREIGN PATENT DOCUMENTS

WO    WO02/078286 A3    10/2002

OTHER PUBLICATIONS

Morgenthal, JP et al.; "Enterprise Application Integration With XML and Java™" [online], Jul. 31, 2000, Prentice Hall, ISBN 0-13-085135-3 < URL: http://proquest.safaribooksonline.com/0130851353 >, Chapter 10.3. Retrieved from the internet Jun. 6, 2007.

(Continued)

*Primary Examiner*—Neveen Abel Jalil
*Assistant Examiner*—Vei-Chung Liang
(74) *Attorney, Agent, or Firm*—Schmeiser, Olsen & Watts; John R. Pivnichny

(57) ABSTRACT

A method for providing processed data definition documents (DDDs) or processed document object models (DOMs) for object oriented programming. The use of these processed data definitions simplifies the data structures and streamlines programming to access the data. A standard DDD/DOM has a hierarchical branched structure having a number of levels each with elements/nodes and attributes. The DDD is written in a platform independent markup language. An element/node is selected and its attributes are identified. All 'children' of the selected element/node are identified. The attributes of the selected element/node (parent) are then copied to each child for all children in the DDD/DOM. This is repeated for all elements/nodes in the DDD/DOM to result in a processed DDD/processed DOM which is now structured to allow program access to data in a more direct manner.

9 Claims, 5 Drawing Sheets

U.S. PATENT DOCUMENTS

| | | |
|---|---|---|
| 2004/0028049 A1 | 2/2004 | Wan |
| 2004/0034830 A1 | 2/2004 | Fuchs et al. |
| 2004/0044991 A1 | 3/2004 | Eschermann et al. |
| 2004/0064826 A1 | 4/2004 | Lim et al. |
| 2005/0076046 A1* | 4/2005 | Goldsack .................... 707/101 |

OTHER PUBLICATIONS

Musciano, Chuck et al.; "HTML & XHTML: The Definitive Guide, 5th Edition" [online], Aug. 25, 2002, O'Reilly & Associates, Inc., ISBN 0-596-00382-X < URL: http://proquest.safaribooksonline.com/059600382X >, Chapter 1.3. Retrieved from the internet Jun. 6, 2007.

* cited by examiner

HIERARCHICAL INHERITED XML DOM

This application is a divisional application claiming priority to Ser. No. 11/058,479, filed Feb. 15, 2005.

BACKGROUND OF THE INVENTION

1. Technical Field

The present invention relates to computer programming and, more particularly, to defining more efficient standard data definitions used in computer programming.

2. Related Art

The need for recording, structuring and passing information between programs or scripts written in different languages running on one or more different platforms is becoming increasingly important. This is accomplished using a standard data definition document (DDD) written in a platform independent language such as eXtensible Markup Language (XML). These standard DDDs are interpreted and stored in computer memory as a document object model (DOM). DOMs have a hierarchical structure having various levels with branching at each successively lower level. Each level has nodes with some nodes being 'parent' nodes that may have 1 or more lower level 'child' nodes ("children").

A DOM is an instance of a DDD running inside a computer.

Prior art DDDs define information ("attributes") for parent nodes; however, it is implied that these attributes are inherited to their children. Therefore, the implied information must be extracted during interpretation of the DDD, or by querying a DOM. This requires specific programming to extract child attributes from a DOM each time they are needed and can be very time consuming and prone to error.

Currently, there is a need of a DDD structure for extracting and using DOM data in a more efficient manner.

SUMMARY OF THE INVENTION

The invention may be described as a method for providing a processed data definition document (DDD) having a hierarchical structure intended to be accessed by an object oriented program comprising the steps of:
 a) providing a standard DDD having elements and attributes;
 b) selecting an element in the DDD that has not yet been selected;
 c) identifying the attributes of the selected element in the DDD;
 d) identifying children of the selected element;
 e) copying the attributes of the selected element to a child of the children; and
 f) repeating step e) for at least one child of the identified children of the selected element.

The invention may also be embodied as a computer program product, comprising a computer usable medium having computer readable program code embodied therein for providing a processed data definition document (DDD), said computer readable program code including an algorithm adapted to:
 a) provide a standard DDD having elements and attributes;
 b) select an element in the DDD that has not yet been selected;
 c) identify the attributes of the selected element in the DDD;
 d) identify children of the selected element;
 e) copy attributes of the selected element to each child; and
 f) repeat step e) for at least one child of the identified children of the selected element.

The present invention may also be expressed as a method of delivering a service offering to provide a processed data definition document (DDD) to a remote user, comprising the steps of:
 a) providing a standard DDD having elements and attributes;
 b) selecting an element in the DDD that has not yet been selected;
 c) identifying the attributes of the selected element in the DDD;
 d) identifying children of the selected element;
 e) copying attributes of the selected element to each child into the DDD;
 f) repeating step e) for at least one child of the identified children of the selected element; and
 g) providing the standard DDD as a processed DDD to said remote user.

An alternate embodiment of the invention may be described as a method for providing a processed document object model (DOM) having a hierarchical structure intended to be accessed by an object oriented program comprising the steps of:
 a) providing a standard DOM having nodes and attributes;
 b) selecting a node in the DOM that has not yet been selected;
 c) identifying the attributes of the selected node in the DOM;
 d) identifying children of the selected node;
 e) copying the attributes of the selected node to a child of the children; and
 f) repeating step e) for at least one child of the identified children of the selected node.

BRIEF DESCRIPTION OF THE DRAWINGS

For purposes of clarity and brevity, like elements and components will bear the same

DETAILED DESCRIPTION OF THE INVENTION

DOM

Figure 1:
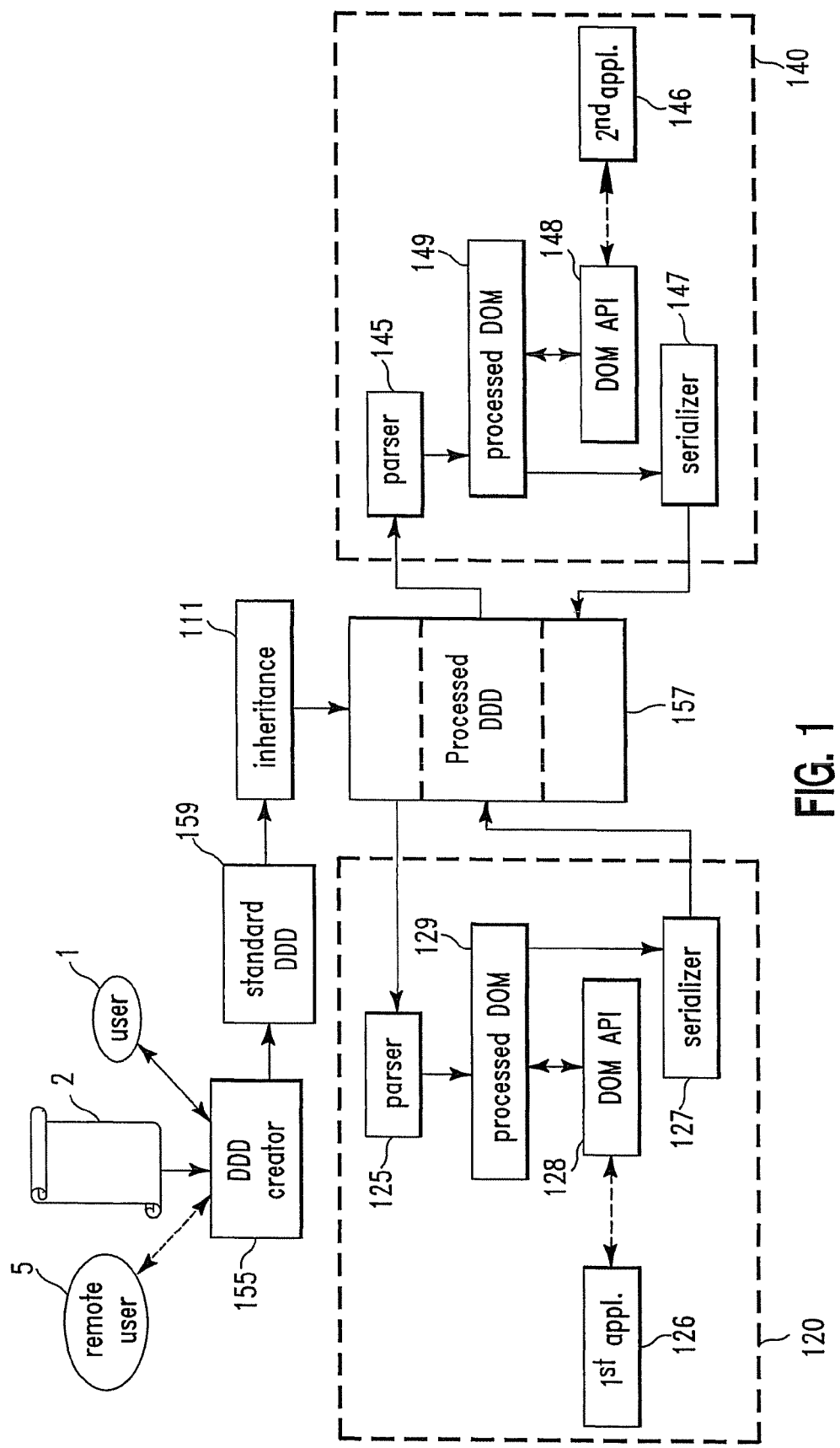
FIG. 1 is a schematic block diagram of a system that generates a processed DDD representing a document according to one embodiment of the present invention.

In recent years, use of a document object model ("DOM") has become a standard format for describing and storing all forms of documents having data in a reusable form. A DOM may be reused many times by different object oriented programming languages ("OOP"). A DOM specification may be represented as a logical "tree" having a plurality of levels each having one or more "nodes," located in a hierarchical branching structure. Each node has various attributes, including at least a "name" attribute, and a "data value" attribute. DOMs are structured to have a hierarchical structure which 'children' nodes and their attributes are derived from a parent node and its attributes.

Interoperability

A DOM is the internal representation of structured data in a computing device. A DOM is created when a DDD is interpreted into a computer memory. DDDs help to increase interoperability by allowing data to be passed between programs, either locally, or on the Web. DDDs are defined in computer independent languages, such as eXtensible Markup Language ("XML"), HyperText markup language ("HTML") and eXtendsible HyperText markup language ("XHTML"). Because these markup languages are ASCII-based, platform dependencies may be minimized or eliminated. A DOM may be serialized back into a DDD. Therefore, different applications may use the DDDs to pass information between them.

Data Definition Document (DDD)

Standard DDDs are written to describe a DOM. A DDD is comprised of a plurality of data elements that are identified by a start and end tag. Each element has a corresponding node in the DOM. The elements may each have one or more defined attributes. After a DOM is modified, a resulting DDD may be created which reflects the modifications.

Standard DDDs explicitly state the attributes of each parent. However, the attributes of the children (unless overridden) are implied through the hierarchical structure.

Even though the DDD provides the attributes of elements in a hierarchical form, the properties of an individual element are not readily available to programmers from this format. This format then requires significant querying of the DOM to extract all of the attributes of the children.

A more detailed description is provided at "http://www.w3.org/DOM/", and "http://xml.coverpages.org/dom.html#intro".

Below is an example of a standard DDD 159 (written here in XML). This provides data on three employees "joe", "john" and "chris".

```
1.  <employee location="raleigh">
2.      <company name="IBM">
3.      </company>
4.      <employee name="joe">
5.      </employee>
6.          <employee name="john" skill-set-ref="project-manager"/>
7.          <employee>
8.              <employee name="chris">
9.              </employee>
10.         </employee>
11. </employee>
```

It can be seen here that tags such as "company", line 2, and "/company" line 3 are the start and end tags for a company element. Similarly there are start and end tags "employee" line 7, and "/employee" line 9, respectively which define an employee element. Everything between the beginning and end tags is part of the element. In line 8, the employee element has an attributes "name" expressed for this element.

Each element of the DDD corresponds to a node of the DOM. When both the beginning tag and the end tag of a first element are inside of a beginning and end tag of a second element, the second element is defined as a 'parent element' and the first element is defined as a 'child element'. The child element is defined "nested" inside of the parent element. The parent element is at a higher hierarchical level than the child.

Since the "employees" are on a hierarchical level lower than the "company name" and "employee location" objects, the employees are all considered to be 'children' of these. Therefore, it is implied that the attributes of "company name" and "employee location" apply equally to each employee (child), "joe", "john" and "chris".

In the prior art, any scripts or code accessing or modifying information of a child element must have a section written to find parent elements, search for attributes of parents, identify all children then copy the parent attributes to each of the children. Since the DDD and DOM are re-used, it is more efficient to perform inheritance once for each DDD/DOM instead of writing the query scripts each time a scripts application requires data.

The present invention automatically copies the attributes from the higher elements in the hierarchy to lower children elements thereby inheriting the attributes. Therefore, the standard DDD above would be converted by the present invention into the processed DDD listed below. The present invention does this function for standard DDDs/DOMs to simplify code writing for all subsequent scripts.

Below is an example of a processed DDD which was created from the standard DDD listed above.

```
<employee location="raleigh">
    <company name="IBM">
    </company>
    <employee name="joe" location="raleigh">
        <company name="IBM">
        </company>
    </employee>
    <employee name="john" skill-set-ref="project-manager" location="raleigh">
        <company name="IBM">
        </company>
    </employee>
    <employee>
        <company name="IBM">
        </company>
        <employee name="chris" skill-set-ref="project-manager" location="raleigh">
            <company name="IBM">
            </company>
        </employee>
    </employee>
</employee>
```

It can be seen here that the attributes location="raleigh" and company name="IBM" have been passed down to ("inherited by") the three 'children' name="joe", "name="john" and name="chris". It can also be seen that "skill-set-ref="project manager" has been inherited downward to name="chris".

All elements and attributes are passed down from each element to children of like elements. In the processed DDDs, all of the attributed of the element are expressed in the element definition. This greatly simplifies the effort required by the programmer to acquire information from the DOM. The programmer does not need to query the DOM to determine if an element has any parents with information which should be inherited. Since the DOMs are reusable, by simplifying the access to each, this effort is saved each time an application is accessed by the DOM.

In an alternative embodiment, it is possible to turn on or off the inheritance capability of portions of the DDD. Therefore, only the portion of the DDD identified will be processed. The attributes of the identified portion will be copied down to children.

FIG. 1 shows a schematic block diagram of one embodiment consistent with one embodiment of the present invention.

The system of the present invention implements a computer independent data structure, such as a DDD to pass information between a $1^{st}$ application ("$1^{st}$ applic.") 126 and a $2^{nd}$ application ("$2^{nd}$ applic.") 146 running on systems 120 and 140, respectively. An electronic input document 2 which may be a web page, a database document, word processing file, image document or other general file containing data, intended to be modeled by a DOM is provided to a DDD creator 155.

Electronic input document 2 is analyzed by DDD creator 155 to determine the raw data (actual data entries) and data schema (data structure, format and hierarchy) of electronic input document 2. The raw data and data schema are converted by DDD creator 155 and stored as a standard DDD 159. A user 1 and/or remote user 5 may direct the document conversion or data modification through the DDD creator 155 to processed DDD 157.

In this embodiment, standard DDD 159 from DDD creator 155 is processed by an inheritance device 111 to create a processed DDD 157 stored in memory. A user 1, or a remote user 5 may direct the document conversion through the DDD creator 155, or perform direct data modification to DDD 157.

Inheritance device 111 modifies the standard DDD 159 received from DDD creator 155 to result in a processed DDD 157 by identifying parents and their children in the standard DDD. The inheritance device also identifies the attributes of the parent. These attributes are then copied down from each parent to its child to produce the processed DDD 157. The processed DDD 157 now has the attributes of the parent copied into the appropriate children elements. Since the attributes are now part of each child element, the access of these attributes has been considerably simplified. The function of inheritance device 111 is described in greater detail in connection with the description of FIG. 4.

The memory in which processed DDD 157 is stored may be segmented having information stored in separate segments, or non-segmented storing information in the same segment. A system 120 includes a parser 125 to process the processed DDD 157 into a document object model, referred to as a processed DOM 129.

A parser 125 converts the DDD 157 into the processed DOM 129 which will run in system 120. Processed DOM 129 is designed such that it may be accessed or modified by applications, such as a 1st applic. 126 through a DOM API 128. 1st applic. 126 may provide queries to DOM API 128 and therefore to processed DOM 129 to determine its hierarchy, attributes, etc. Processed DOM 129 can therefore be accessed and modified by $1^{st}$ Appl. 126 through DOM API 128. If one were to require attribute information of a child node of the DOM, there would be less time and effort spent providing scripted queries to the processed DOM 129 with the present invention to extract this information as compared with the prior art.

Information in processed DOM 129 may also be passed to other applications, such as a 2nd applic. 146 running on system 140, through the use of processed DDD 157 as an intermediary file. Processed DOM 129 may be serialized into an equivalent file, a processed DDD 157 by a serializer 127. When such data is required by another application, DDD 157 is passed to system 140 for use.

A parser 145 is similar to parser 125, and converts processed DDD 157 into processed DOM 149. $2^{nd}$ Appl. 146 accesses and modifies processed DOM 149 through DOM API 148. Processed DOM 149 may also be converted back to processed DDD 157 using a serializer 147. Therefore, each application may make changes to the shared information through the use of the processed DDD intermediary file. As stated above, the processed DOMs 129, 149 and processed DDD 157 allow more efficient data access and modification as compared with the prior art.

The processed DOMs 129, 149 may be accessed by 1st applic. 126 and $2^{nd}$ applic. 146, respectively, with less programming required. The programming required is also much simpler than that of the equivalent prior art.

Figure 2:
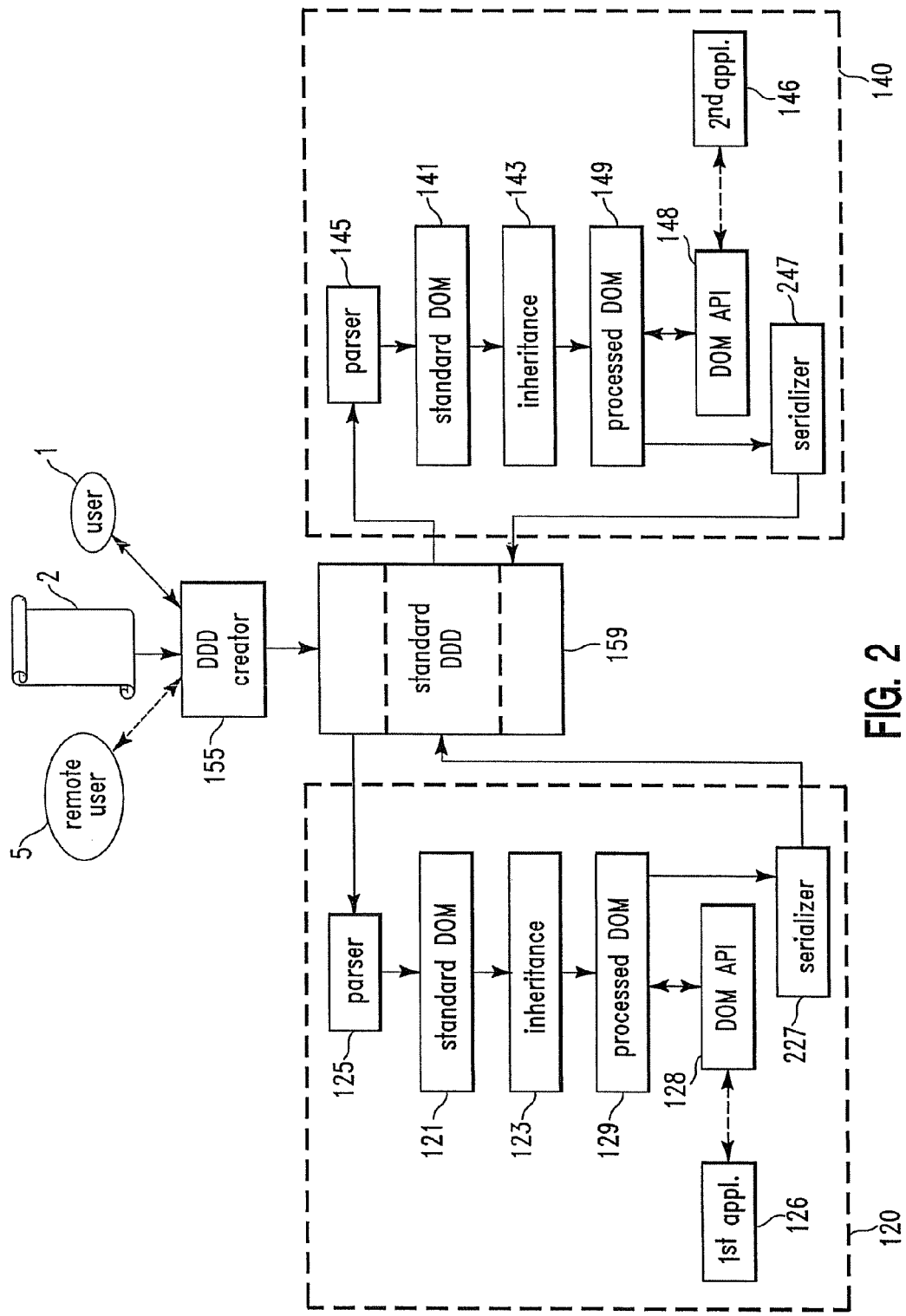
FIG. 2 is a schematic block diagram of a system that generates a processed DDD representing a document according to a second embodiment of the present invention.

FIG. 2 shows a schematic block diagram of one embodiment consistent with a second embodiment of the present invention.

The system of the present invention implements a computer independent data structure, such as a standard DDD to pass information between two applications. An electronic input document 2 which may be a web page, a database document, word processing file, image document or other general file containing data, intended to be modeled by a DOM is provided to a DDD creator 155.

Electronic input document 2 is analyzed by DDD creator 155 to determine the raw data and data schema of electronic input document 2. The raw data and data schema are converted by DDD creator 155 and stored as a standard DDD 159. A user 1, or a remote user 5 may direct the document conversion through the DDD creator 155, or perform direct data modification to standard DDD 159.

System 120 accesses the standard DDD 159 and parser 125 parses it into a standard DOM 121 stored in memory.

Inheritance device 123 modifies the standard DOM 121 to result in a processed DOM 129 by identifying parent nodes and their children in the standard DOM. Inheritance device 123 also identifies the attributes of the parent nodes. These attributes are then copied down from each parent node to its child to produce the processed DOM 129. The processed DOM 129 now has the attributes of the parent copied into the appropriate children elements. Since the attributes are now part of each child element, the access of these attributes has been considerably simplified.

$1^{st}$ appl. 126 is allowed to interact with processed DOM 129 through DOM API 128 as described above for the previous embodiment. Serializer 227 copies processed DOM 129 into a standard DDD 159 format.

System 140 accesses the standard DDD 159 and parser 145 parses it into a standard DOM 141, similar in format to standard DOM 121 of system 120. Inheritance device 143 then functions similar to inheritance device 123 of system 120 to create the internal representation of the data as a processed DOM 149.

$2^{nd}$ appl. 146 is allowed to interact with processed DOM 149 through DOM API 148 similar to that described above for system 120 and the previous embodiment. Serializer 247 copies processed DOM 149 into either a standard DDD 159 format.

The function of inheritance device (111 of FIG. 1) is described in greater detail in connection with FIG. 4. The function of inheritance devices 123, 143 in the alternate embodiment shown in FIG. 2 is described in greater detail in connection with FIG. 5.

Figure 3:
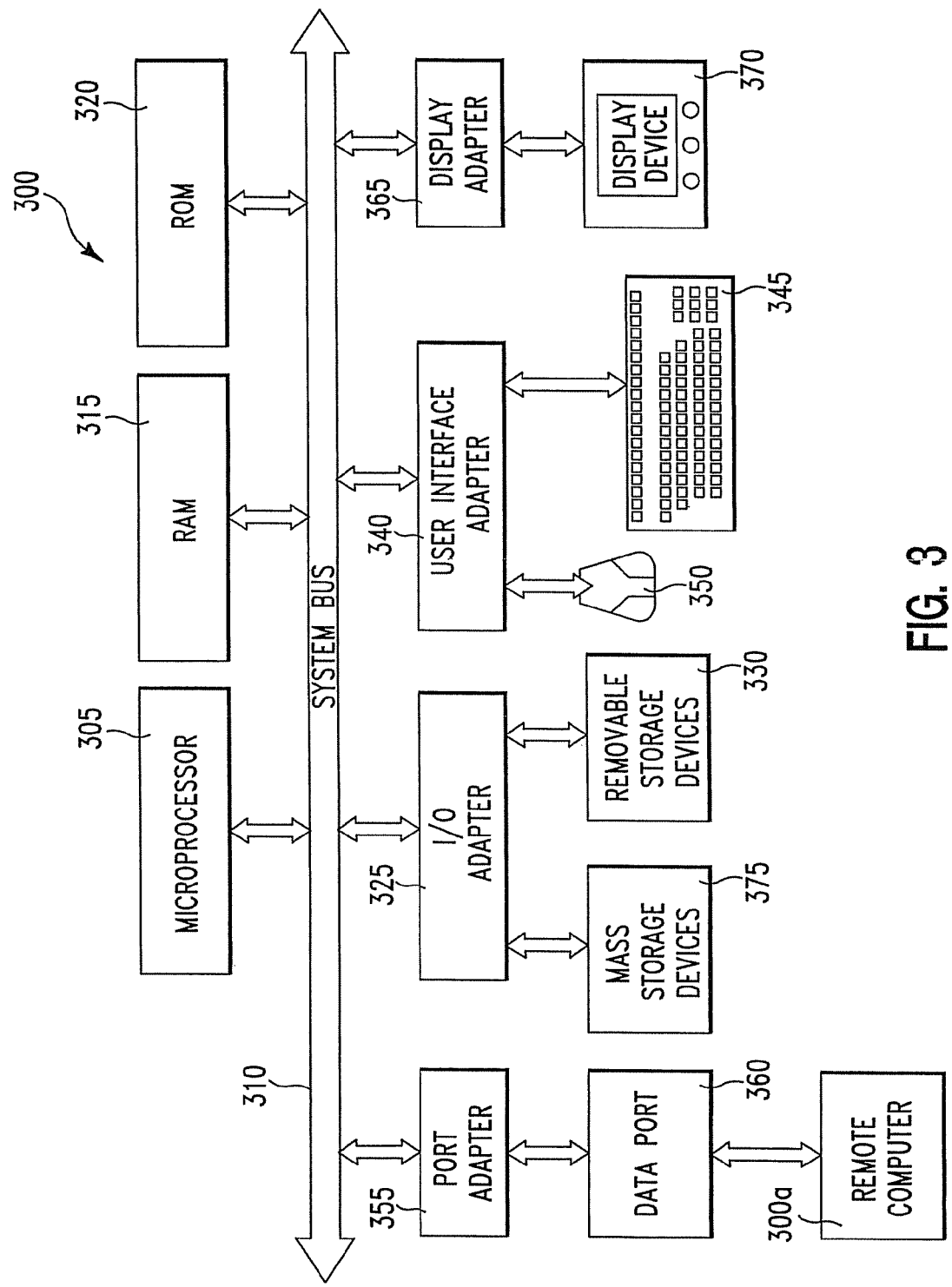
FIG. 3 is a schematic block diagram of a computer system capable of performing the functions of the present invention.

Generally, the elements described in FIGS. 1 and 2 may be implemented on a single computer system 300 such as that shown in FIG. 3. It is also possible that one or more of the functions may be practiced by several interconnected computer systems, such as system 300a of FIG. 3 with each computer system performing one or more of the above-described functions. The methods described above may be coded as a set of machine-readable instructions and stored on removable or hard disk media for use by the general-purpose computer. FIG. 3 is a schematic block diagram of a general-purpose computer for practicing the present invention. In FIG. 3, a computer system 300 has at least one microprocessor or central processing unit (CPU) 305. CPU 305 is interconnected via a system bus 310 to a random access memory (RAM) 315, a read-only memory (ROM) 320, an input/output (I/O) adapter 325 for communicating with a removable data and/or program storage device 330 and a mass data and/or program storage device 375. System bus 310 is also connected to a user interface adapter 340 for connecting a keyboard 345 and a mouse 350, a port adapter 355 for connecting a data port 360 such as a network interface adapter (NIC) and a display adapter 365 for connecting a display device 370. The NIC may be used to connect to remote databases and computers.

ROM 320 contains basic operating system instructions for computer system 300. The operating system may alternatively reside in RAM 315 or elsewhere as is known in the art. Examples of removable data and/or program storage device 330 include magnetic media such as floppy drives and tape drives and optical media such as CD ROM drives. Examples of mass data and/or program storage device 375 include one or more hard disk drives and nonvolatile memory such as flash memory. These may be local or remote, directly connected, or connected through a network. In addition to keyboard 345 and mouse 350, other user input devices such as trackballs, writing tablets, pressure pads, microphones, light pens and position-sensing screen displays may be connected to user interface 340. Examples of display devices include cathode-ray tubes (CRT), plasma displays and liquid crystal displays (LCD).

A computer program may be created by one of ordinary skill in the art and stored on the mass data and/or program storage device 375, or fed into the computer through a data connection and executed to practice the present invention.

While FIG. 3 shows the computer system 300 as a particular configuration of hardware and software, any configuration of hardware and software, as would be known to a person of ordinary skill in the art, may be utilized for the purposes stated above in conjunction with the use of computer system 300 of FIG. 3.

Figure 4:
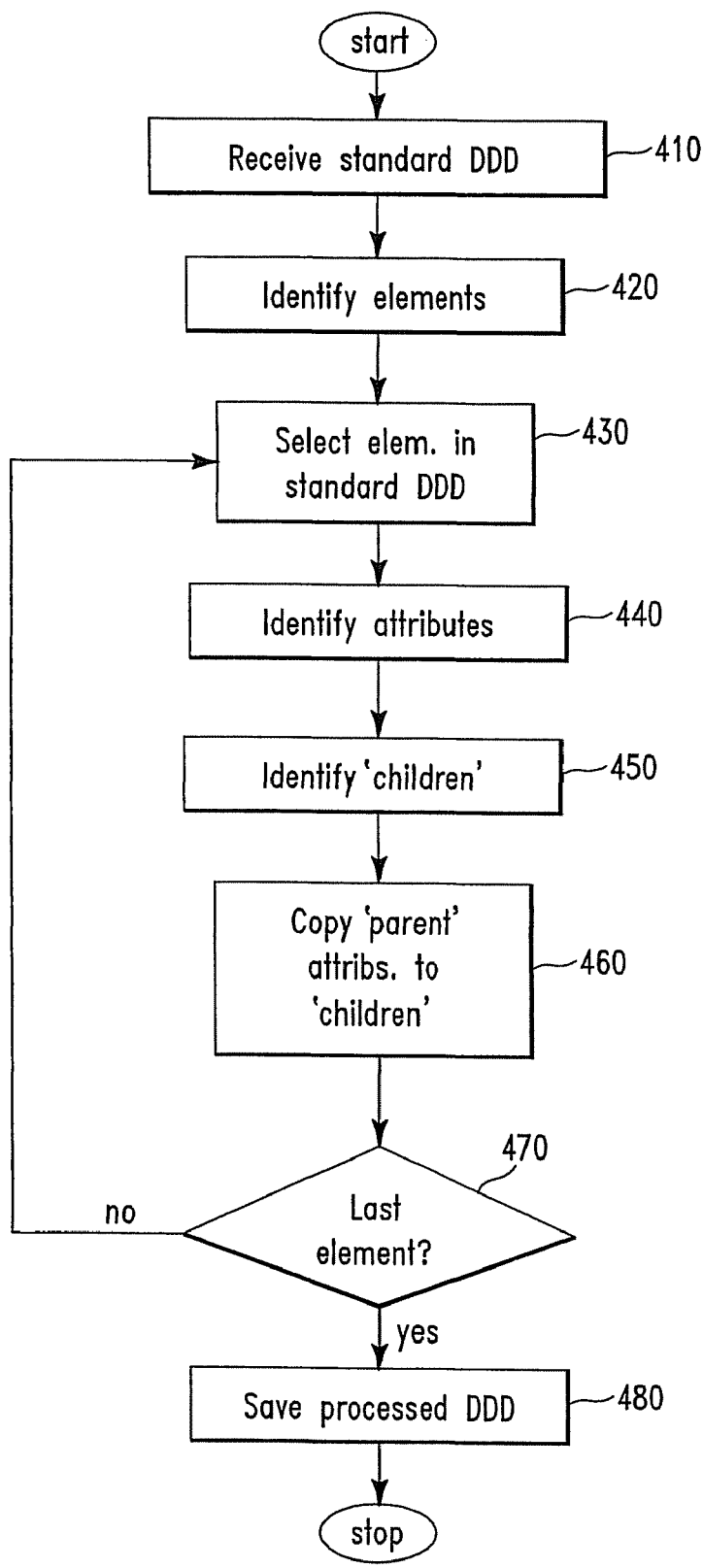
FIG. 4 is a simplified flow chart describing the functioning of a first embodiment of the present invention.

FIG. 4 is a simplified flow chart illustrating the major functions of a first embodiment of the inheritance device according to the present invention. In step 410 a standard DDD is received from DDD creator (155 of FIG. 1).

In step 420, inheritance device (111 of FIG. 1) identifies tags in the DDD to identify discrete elements in step 420.

A first element is selected in step 430 and the attributes are identified in step 440.

Inheritance device (111 of FIG. 1) then identifies the nesting structure of the tags to identify children of the selected element in step 450. Those elements having both a start and end tag sandwiched between the start and end tags of a second element are said to be children of the second element.

The attributes of the selected element are then copied to the child nodes in step 460.

In step 470 it is determined if the last element has been processed. If "yes", the elements and attributes are stored as a new file in step 480 identified as a processed DDD (157 of FIG. 1).

If "no", then steps 430 through 470 are repeated until all elements have been processed.

Once the last element has been processed, the process stops.

Figure 5:
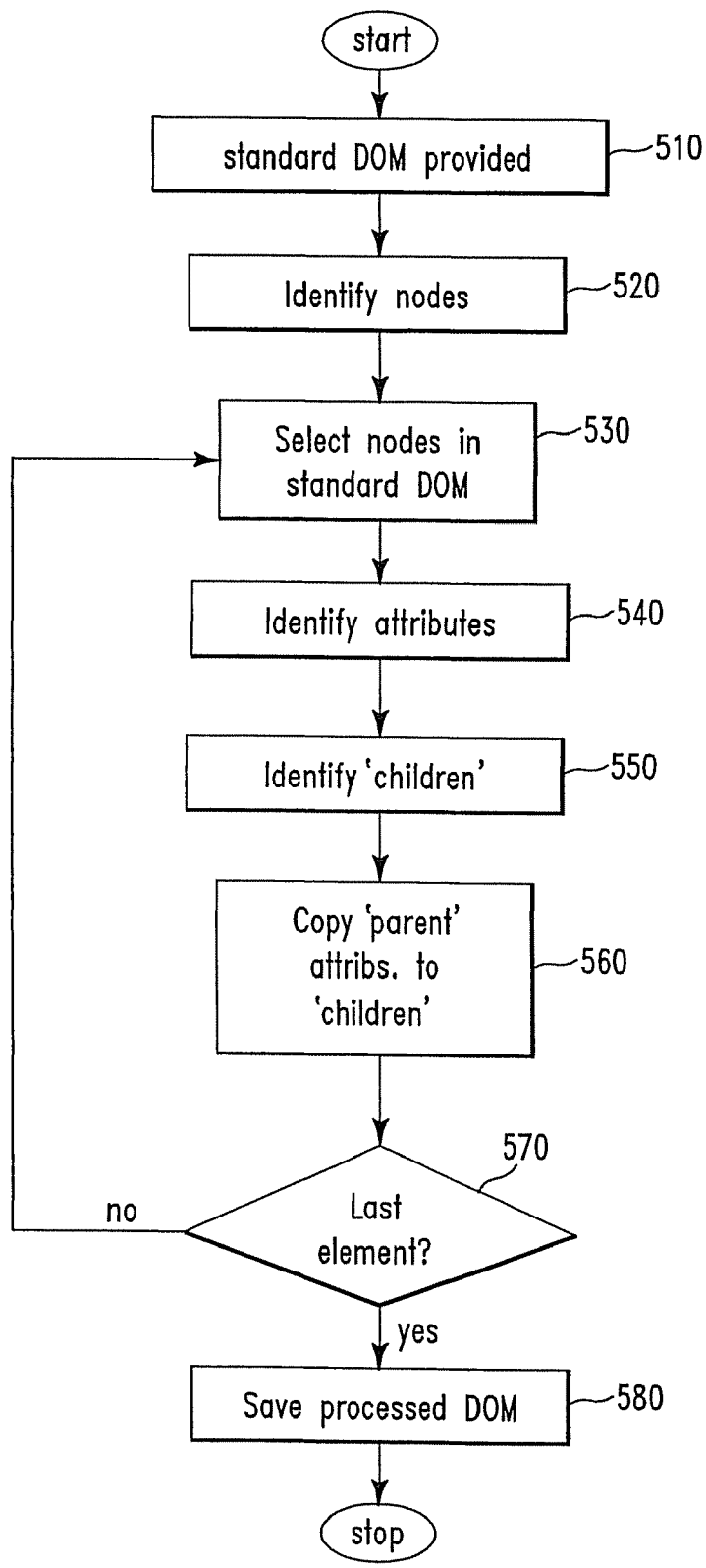
FIG. 5 is a simplified flow chart describing the functioning of a second embodiment of the present invention.

FIG. 5 is a simplified flow chart illustrating the major functions of a second embodiment of the inheritance device according to the present invention.

In step 510, inheritance device (123 of FIG. 2) is given access to standard DOM (121 of FIG. 2).

In step 520, inheritance device 123 identifies nodes and branching structure of the standard DOM.

A first node of standard DOM (121 of FIG. 2) is selected in step 530 and the attributes are identified in step 540.

Inheritance device (123 of FIG. 2) then identifies children of the selected node in step 550. A node which is derived from another node is said to be its child, or collectively, children.

The attributes of the selected element are then copied to the child nodes in step 560.

In step 570 it is determined if the last node has been processed. If "yes", the elements and attributes are stored as a new file in step 580 identified as a processed DOM (129 of FIG. 2).

If "no", then steps 530 through 570 are repeated until all elements have been processed.

Once the last element has been processed, the process stops.

Inheritance device 143 of system 140 functions in the same manner of inheritance device 123 described above.

The functional blocks of FIGS. 1 and 2 may be implemented by running stored software in memory and accessing them with a processor coupled to the memory. One or more of the processors and memory may be located at a remote location with reference to the user/remote user (1/5 of FIG. 1) such as on the Internet. Therefore, any or all pieces of the invention may be in different locations and communicate remotely to provide the desired services.

While embodiments of the present invention have been described herein for purposes of illustration, many modifications and changes will become apparent to those skilled in the art.

Accordingly, the appended claims are intended to encompass all such modifications and changes as fall within the true spirit and scope of this invention.

What is claimed is:

1. A method for providing a standard data definition document (DDD) having a hierarchical structure intended to be accessed by an application, said method comprising:

determining raw data and data schema of an electronic document that is not a DDD;

converting the raw data and data schema into a first standard DDD and storing the first standard DDD in a memory of a computer system, said first standard DDD comprising parent elements such that each parent element has attributes and at least one child element;

converting, by a first system comprising a first application, the first standard DDD to generate a first standard document object model (DOM);

processing the first standard DOM to generate a first processed DOM, wherein said processing the first standard DOM comprises identifying at least one parent element of the first standard DOM and for each parent element: identifying at least one attribute and at least one child element of said each parent element and copying the at least one attribute to each child element of said each parent element;

modifying, by the first application, the first processed DOM to generate a modified first processed DOM; and converting, by the first system, the modified first processed DOM, to generate a second standard DDD and storing the second standard DDD in the memory of the computer system.

2. The method of claim 1, said method further comprising:

converting, by a second system comprising a second application, the second standard DDD to generate a second standard document object model (DOM);

processing the second standard DOM to generate a second processed DOM, wherein said processing the second standard DOM comprises identifying at least one parent element of the second standard DOM and for each parent element: identifying at least one attribute and at least one child element of said each parent element and copying the at least one attribute to each child element of said each parent element;

modifying, by the second application, the second processed DOM to generate a modified second processed DOM; and converting, by the second system, the modified second processed DOM, to generate a third standard DDD and storing the third standard DDD in the memory of the computer system.

3. The method of claim 2, said method further comprising:

converting, by the first system, the third standard DDD to generate a third standard document object model (DOM);

processing the third standard DOM to generate a third processed DOM, wherein said processing the third standard DOM comprises identifying at least one parent element of the third standard DOM and for each parent element: identifying at least one attribute and at least one child element of said each parent element and copying the at least one attribute to each child element of said each parent element;

modifying, by the first application, the third processed DOM to generate a modified third processed DOM; and converting, by the first system, the modified third processed DOM, to generate a fourth standard DDD and storing the fourth standard DDD in the memory of the computer system.

4. The method of claim 1, wherein the electronic document is a web page.

5. The method of claim 1, wherein the electronic document is a word processing file.

6. The method of claim 1, wherein the first standard DDD is written in a markup language.

7. The method of claim 1, wherein the first standard DDD is written in eXtensible Markup Language (XML).

8. The method of claim 1, wherein the first standard DDD is written in eXtensible Hypertext Markup Language (XHTML).

9. A computer program product, comprising a computer usable storage medium having computer readable program code stored therein for providing a processed data definition document (DDD), said computer readable program code including an algorithm configured to implement the method of claim 1.

* * * * *